United States Patent Office 3,801,491
Patented Apr. 2, 1974

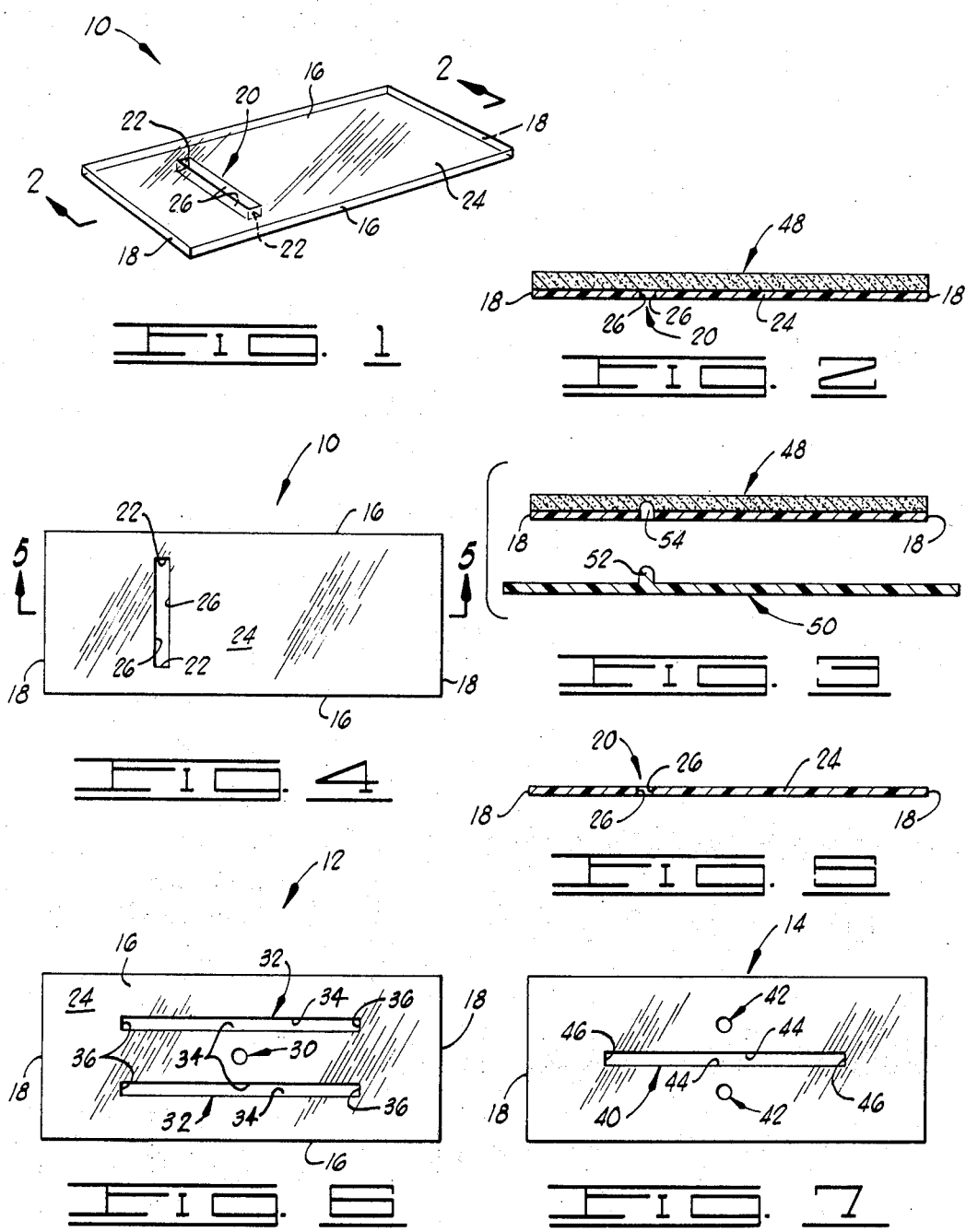

3,801,491
STABILIZING MEDIA TEMPLATE
Leo P. Cawley, 550 N. Hillside, Wichita, Kans. 67208
Original application Feb. 9, 1970, Ser. No. 9,624, now Patent No. 3,691,054. Divided and this application Apr. 10, 1972, Ser. No. 242,872
Int. Cl. B01k 5/00
U.S. Cl. 204—299
3 Claims

ABSTRACT OF THE DISCLOSURE

This invention is a template structure for electrophoresis and immunoelectrophoresis processes including a relatively thin sheet member inert to and adapted to receive a stabilizing media gel on one side and having an aperture therein. More particularly, this invention relates to a thin sheet member with an aperature and adapted to receive on a surface a relatively thin coating of the stabilizing media gel forming a well with the aperture to receive a sample of serum therein.

---

This is a division of application Ser. No. 9,624, filed Feb. 9, 1970 now U.S. Pat. No. 3,691,054.

Numerous types of electrophoretic sample means are known in the prior art adapted to hold serum specimens in a stabilizing media. However, these prior art devices require a cavity to be made in the stabilizing media gel adapted to receive the serum specimen. The prior art devices normally consist of an imperforate slide strip member coated with the stabilizing media gel wherein the serum specimen is placed.

In the preferred specific embodiments of this invention, hereafter described, an electrophoretic sample means is provided having an aperture adapted to receive the serum specimen and place same with the stabilizing media gel.

In a preferred specific embodiment of the stabilizing media template of this invention, a sheet member is provided having a generally elongated rectangular exterior shape and having an elongated rectangular shaped aperture therethrough referred to as a slide strip member. The aperture is preferably oriented transversely to the elongated slide strip, and provides communication between the side surfaces.

In another preferred specific embodiment of the stabilizing media template of this invention, a slide strip member is provided having a generally elongated rectangular shape and having an elongated rectangular shaped aperture and two (2) cylindrical shaped apertures. The rectangular aperture is longitudinally aligned with the slide strip member in the center portion thereof and the cylindrical apertures positioned generally centered along the opposite sides of the rectangular aperture, all providing communication between the side surfaces of the slide strip.

An additional preferred specific embodiment of the stabilizing media template of this invention is provided having a generally elongated rectangular shape and having a cylindrical aperture and two (2) elongated rectangular apertures therethrough. The cylindical aperture is generally central relative to the slide strip member connecting the surfaces thereof and the two (2) rectangular apertures positioned on opposite sides of the cylindrical aperture generally aligned longitudinally with the slide strip.

The slide strip member is preferably constructed of a thin material inert to the stabilizing media gel and adapted to adhere to the sabilizing media gel. The slide strip member is preferably constructed of plastic film, glass or metal material. The stabilizing media gel peculiar to electrophoresis and immunolectrophoresis processes is an optically clear thermosetting gel, usually agarose or agar gel, which is applied to one side of the slide strip member by various methods of spraying, molding and applying by capillary action, then spreading to a thin uniform layer.

One object of this invention is to overcome the aforementioned disadvantages of the prior art devices.

Another object of this invention is to provide a serum specimen container which has a uniform arrangement for holding the serum specimens.

Still another object of this invention is to provide a slide strip which by virtue of its uniformness in shape and size of sample cavity formed provides more uniform serum specimen containers for electrophoresis and immunoelectrophoresis processes.

Various other objects, advantages, and features of the invention will become apparent to those skilled in the art from the following discussion, taken on conjunction with the accompanying drawings, in which:

FIG. 1 is a perspective view of a template shown constructed of clear plastic material having a transversely oriented rectangular aperture therein;

FIG. 2 is a longitudinally cross-sectional view taken on line 2—2 of the template shown in FIG. 1 and having the stabilizing media gel coating thereon;

FIG. 3 is a longitudinal exploded cross-sectional view of the template similar to the one shown in FIG. 1 having the stabilizing media gel coating thereon and having an impression mold therebelow;

FIG. 4 is a top plan view of the template shown in FIG. 1;

FIG. 5 is a cross-sectional view of the template shown in FIG. 1 taken on line 5—5 of FIG. 4;

FIG. 6 is a top plan view of a template, constructed of clear plastic material, having a circular shaped aperture and two (2) elongated rectangular shaped apertures; and FIG. 7 is a top plan view of a template, constructed of clear plastic material, having an elongated rectangular shaped aperture and two (2) circular shaped apertures.

The following is a discussion and description of preferred specific embodiments of the new stabilizing media template of this invention, such being made with reference to the drawings, whereupon the same reference numerals are used to indicate the same or similar parts and/or structure. It is to be understood that such discussion and decription is not to unduly limit the scope of the invention.

Referring to the drawings in detail and in particular to FIGS. 1, 6 and 7, the stabilizing media template of this invention is shown therein in three (3) preferred specific embodiments. Namely, (1) a template structure having a transverse rectangularly shaped aperture, generally indicated at 10; (2) a template structure having one (1) cylindrical and two (2) rectangular apertures, generally indicated at 12; and (3) a template structure having one (1) rectangular and two (2) cylindrical apertures, generally indicated at 14.

In general the stabilizing media template of this invention is preferably made of a film like transparent, clear plastic material or clear glass or thin metal material, all of which are inert to the stabilizing media gel, and is preferably formed in a thin cross section and elongated rectangular planform with parallel elongated side edges 16 and parallel end edges 18. It has been found preferable to use flexible clear plastic film such as that sold under thet trademarks Cronar and Mylar, specifically Cronar Film, P40B, 35 mm., unperforated, 0.004" thick, and Mylar D, uncoated, 0.005" thick, products of E. I. du Pont de Nemours & Co., Wilmington, Del., and Phillips Petroleum Co., Bartlesville, Okla., respectively.

The stabilizing media gel preferably used is that which is common to electrophoresis and immunoelectrophoresis processes, namely, agarose or agar gel, a transparent gel material. The stabilizing media gel is buffered in the usual manner and applied in viscous fluid form to the surface of the template structure by methods described hereafter and readily adheres to same. Upon application to one side of the template in semi-solid form, it is allowed to harden or set thereon, usually at room temperature for about five to ten minutes.

In the first above-described preferred specific embodiment of the stabilizing media template 10, a template structure is provided having a rectangular shaped aperture therein, indicated at 20, transverse to the elongated rectangular planform of the template 10. The aperture 20 connects both surfaces of the template 10 and is oriented parallel to the end edges 18 of the template 10 having ends 22 parallel to the elongated edges 16 and within the sheet portion 24 of the structure. Sides 26 of the aperture 20 are parallel to the end edges 18.

In the second above-described preferred specific embodiment of the stabilizing media template 12, a template structure is provided having a cylindrical shaped aperture 30 and two (2) rectangular apertures 32. The cylindrical aperture 30 is preferably positioned centrally relative to edges 16 and 18 of the template 12 and axially therethrough the sheet portion 24. The rectangular apertures 32 are preferably positioned longitudinally parallel with the elongated edges 16 of the template 12 and positioned on opposite sides of the cylindrical aperture 30 and spaced between the aperture 30 and the edges 16. The elongated edges 34 of the rectangular aperture are parallel and parallel to the template edges 16 and the ends 36 are parallel and parallel to the template ends 18. The rectangular apertures 32 are sized to be wholly lengthwise within the sheet portion 24 of the template 12. The cylindrical aperture 30 preferably has a diameter of approximately the same dimension as the width of the rectangular aperture 32.

In the third above-described preferred specific embodiment of the stabilizing media template 14 of this invention, a template structure is provided having a rectangular aperture 40 and two (2) cylindrical apertures 42. The rectangular aperture 40 is preferably positioned in the center portion of the sheet portion of the template 14 longitudinally aligning therewith.

Edges 44 of the aperture 40 are parallel and parallel to the long edges 16 of the structure and the ends 46 of the aperture 40 are also parallel and parallel to the ends 18 of the structure. The cylindrical apertures 42 are positioned alongside the central portion of the rectangular aperture 40 on opposite sides thereof, spaced between same aperture and the edges 16 of the template 14. In size relationship, the diameter of the circular apertures is approximately the same dimensions as the width of the rectangular aperture 40.

The aperture through the sheet member used to make the template of this invention can be made therethrough in any suitable manner. It has been found that the clear plastic film can be apertured by proper sized punches in a stamping operation, and many sheets at a time, if desired. Likewise, thin metal sheet members can be punched singularly or many at a time. It has been found desirable to make the apertures through glass material by cutting the glass, or by drilling same. And, of course, all of the materials can be drilled to provide the apertures therethrough, and the resulting well walls for the serum well when the stabilizing media gel is coated on one side of the sheet member to produce the template of this invention.

In use the stabilizing media template of this invention can be coated on one surface with the stabilizing media gel 48 as described, supra. The stabilizing gel 48 can be shaped with the template in two (2) arrangements. In one arrangement shown in FIG. 2 the stabilizing gel 48 is placed on one surface of the sheet portion 24 of the template, surface tension of the gel 48 and its viscosity prevents it from passing into the aperture, however, if it does, a piece of tape can be placed over the apertures to prevent this. The finished product provides a small cavity in which the serum is placed in using the template. In the second arrangement, a large cavity can be produced for receipt of the serum, this arrangement is shown in FIG. 3.

A template having the apertures of any of the above-described embodiments of apertures is placed on a mold 50 of any suitable material having an extended portion 52 passing through the apertures of the particular template and extending thereabove. When gel 48 is placed on the upper surface of the template it molds around the portion 52 extending through the template, once the gel has set sufficiently the mold 50 is removed from the template and the stabilizing media template is left with a molded layer of stabilizing media gel having a cavity 54 molded therein.

The sheet member for the template structure of the invention is marked on one side for origin of the serum sample to be tested and anodic migration point, coated with stabilizing gel, inoculated with the serum in the template well, as set forth hereinbefore, electrophoretically treated, stained, dried and scanned for results. If the template is constructed of clear plastic material or glass, the viewing can be from either side of the template, and the results are always easily read through the clear glass or plastic. A metal template not being transparent, has to be scanned or read through the dried gel. In most instances, the dried agarose gel is transparent and clear enough to obtain a good reading of the results.

As will be apparent from the foregoing description of the stabilizing media template, relatively inexpensive means has been provided to receive and hold serum samples for treatment. The template structure is economical to manufacture, simple to use and provides uniformity in size and shape of the electrophoresis sample container cavities.

While the invention has been described in conjunction with preferred specific embodiments thereof, it will be understood that this description is intended to illustrate and not limit the scope of the invention, which is defined by the following claims.

I claim:

1. A template structure for electrophoresis and immunoelectrophoresis comprising a sheet member of material inert to a stabilizing media gel having a structure defining at least one opening, and a mold member having said sheet member superincumbently positioned thereon, said mold member comprising a structure having at least one protrusion member integrally bound thereto passing through said member at least one opening and extending thereabove.

2. The template structure of claim 1 wherein said template further comprises a generally centrally positioned elongated slot, an essentially circular hole in close proximity to said elongated slot and an aperture generally centrally positioned, wherein said elongated slot is centrally positioned and longitudinally oriented relative to said sheet member, said circular hole is oriented relative to one side of the center portion of the elongated sides of said elongated slot and said aperture is circularly shaped and oriented relative to the other side of said center portion of said elongated sides of said elongated slot.

3. The template structure of claim 1 wherein said template further comprises a generally centrally positioned elongated slot, an essentially circular hole in close proximity to said elongated slot and an aperture generally centrally positioned wherein said circular hole is centrally positioned relative to said sheet member and extends axially therethrough, said elongated slot is positioned longitudinally on one side of said circular hole, and said aperture is elongated rectangularly shaped and situated longitudinally with respect to said sheet member on the opposite side of said circular hole from where said elongated slot is positioned.

References Cited
UNITED STATES PATENTS

| | | | |
|---|---|---|---|
| 3,482,943 | 12/1969 | Csizmas et al. | 204—299 X |
| 1,006,393 | 10/1911 | Montgomery | 35—37 |
| 1,353,279 | 9/1920 | Schulthess | 116—119 |
| 1,493,485 | 5/1924 | Faust | 35—37 |
| 1,716,036 | 6/1929 | Dunning, Jr. | 35—37 |
| 2,850,811 | 9/1958 | Boley | 35—37 |
| 3,635,808 | 1/1972 | Elevitch | 204—180 G |

J. H. MACK, Primary Examiner

A. C. PRESCOTT, Assistant Examiner

U.S. Cl. X.R.

204—180 G